(12) United States Patent
Smith

(10) Patent No.: US 6,285,349 B1
(45) Date of Patent: Sep. 4, 2001

(54) CORRECTING NON-UNIFORMITY IN DISPLAYS

(75) Inventor: Ronald D. Smith, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/259,396

(22) Filed: Feb. 26, 1999

(51) Int. Cl.[7] .................................................. G09G 5/10
(52) U.S. Cl. ..................... 345/147; 348/180; 348/181; 348/744; 345/204; 345/150
(58) Field of Search ..................... 345/89, 204, 147, 345/150, 207; 348/180, 181, 744, 189

(56) References Cited

U.S. PATENT DOCUMENTS

| | | | | |
|---|---|---|---|---|
| 5,115,229 | * | 5/1992 | Shalit ........................................ | 345/1 |
| 5,325,195 | * | 6/1994 | Ellis et al. ............................. | 348/189 |
| 5,369,432 | * | 11/1994 | Kennedy ................................ | 348/181 |
| 5,386,253 | * | 1/1995 | Fielding ................................ | 348/745 |
| 5,483,259 | * | 1/1996 | Sachs .................................... | 348/189 |
| 5,650,844 | * | 7/1997 | Aoki et al. ............................ | 356/237 |
| 5,798,790 | * | 8/1998 | Knox et al. ........................... | 348/191 |

OTHER PUBLICATIONS

Smith, U.S. Pat. application Ser. No. 09/252,383, filed Feb. 18, 1999, entitled "Calibrating Projection Displays".
Smith, U.S. Pat. application Ser. No. 09/258,060, filed Feb. 26, 1999, entitled "Calibrating Projection Displays".

* cited by examiner

*Primary Examiner*—Kent Chang
(74) *Attorney, Agent, or Firm*—Trop, Pruner & Hu, P.C.

(57) ABSTRACT

In calibrating displays, analog information may be converted into digital information to control the display. The requirements of the analog to digital converter may be decreased by decreasing the necessary dynamic range for the analog to digital converter. This may be done by developing a first calibration signal indicative of a first plurality of pixels of the display and developing a second calibration signal indicative of a second plurality of the display. The first and second signals may be subtracted from each other and that signal may then be converted to a digital signal with reduced dynamic range requirements for the analog to digital converter.

16 Claims, 6 Drawing Sheets

CORRECTING NON-UNIFORMITY IN DISPLAYS

BACKGROUND

The invention relates to correcting non-uniformity in displays such as projection displays.

A liquid crystal display (LCD) includes an array of pixels that may be manipulated to present an image. A LCD panel typically includes two glass plates and a liquid crystal material between them. One application of LCDs is in projection displays, in which one or more LCDs may be used to modulate the intensity or polarization of light from a light source. In a color projection display, multiple LCDs may be used, one for red, one for blue, and one for green, for example. The images generated by each of the LCDs are aligned and combined through a lens assembly and projected onto an external screen.

Some LCD projection systems use reflective LCD panels, in which each LCD panel modulates incident light beams and reflects the modulated beams so that the modulated beams return along predetermined paths. In this manner, the modulated beams may be directed through a lens assembly to form images on a display screen that add together to form a color composite image.

Reflective LCD panels may contain certain non-uniformities that are caused by the semiconductor processes used to manufacture reflective substrates in the reflective LCD panel. For example, such non-uniformities may be caused by different transistor gains, different storage capacitor values, leakage currents, and etching variations on the pixel mirror surface. As a result, subtle variations in light output from the pixels of each reflective LCD panel may be introduced. In addition, the projection lens assembly may not be completely free of variation in its flatness of field, which may further add to non-uniformity of a displayed image.

One way to correct for these non-uniformities is to measure the light output of each pixel and compare it to the expected light output. It might be difficult to single out a particular pixel and may be easier to measure the entire light output of the display. However for a 1024×768 display there is one pixel being measured and 786431 which are not, but still influence the measured result. Measuring a pixel to one part in 256 when each pixel is one part in 786432 makes high demands on the measurement accuracy.

Such non-uniformities between pixels of a displayed image may become obvious to a viewer if the viewer watches the image on the screen for some amount of time, such as more than a few seconds. Making the needed calibration measurements is difficult and requires very high accuracy circuits.

Thus, a need exists for a technique and apparatus to make the measurement with sufficient accuracy so that the non-uniformity may be calibrated out of the display system.

SUMMARY

In accordance with one embodiment, a method of calibrating a display includes developing a first signal indicative of the light output of a first set of pixels of a display. A second signal indicative of the light output of a second set of pixels of a display and a third signal indicative of the difference between said first and second signals are developed. The third signal is converted into a digital signal.

DETAILED DESCRIPTION

In the following description, numerous details are set forth to provide an understanding of the present invention. However, it is to be understood by those skilled in the art that the present invention may be practiced without these details and that numerous variations or modifications from the described embodiments may be possible. For example, although the description refers to a projection display system, it is contemplated that other types of display systems (e.g., displays based on organic polymers) may be included in further embodiments.

Figure 1A:
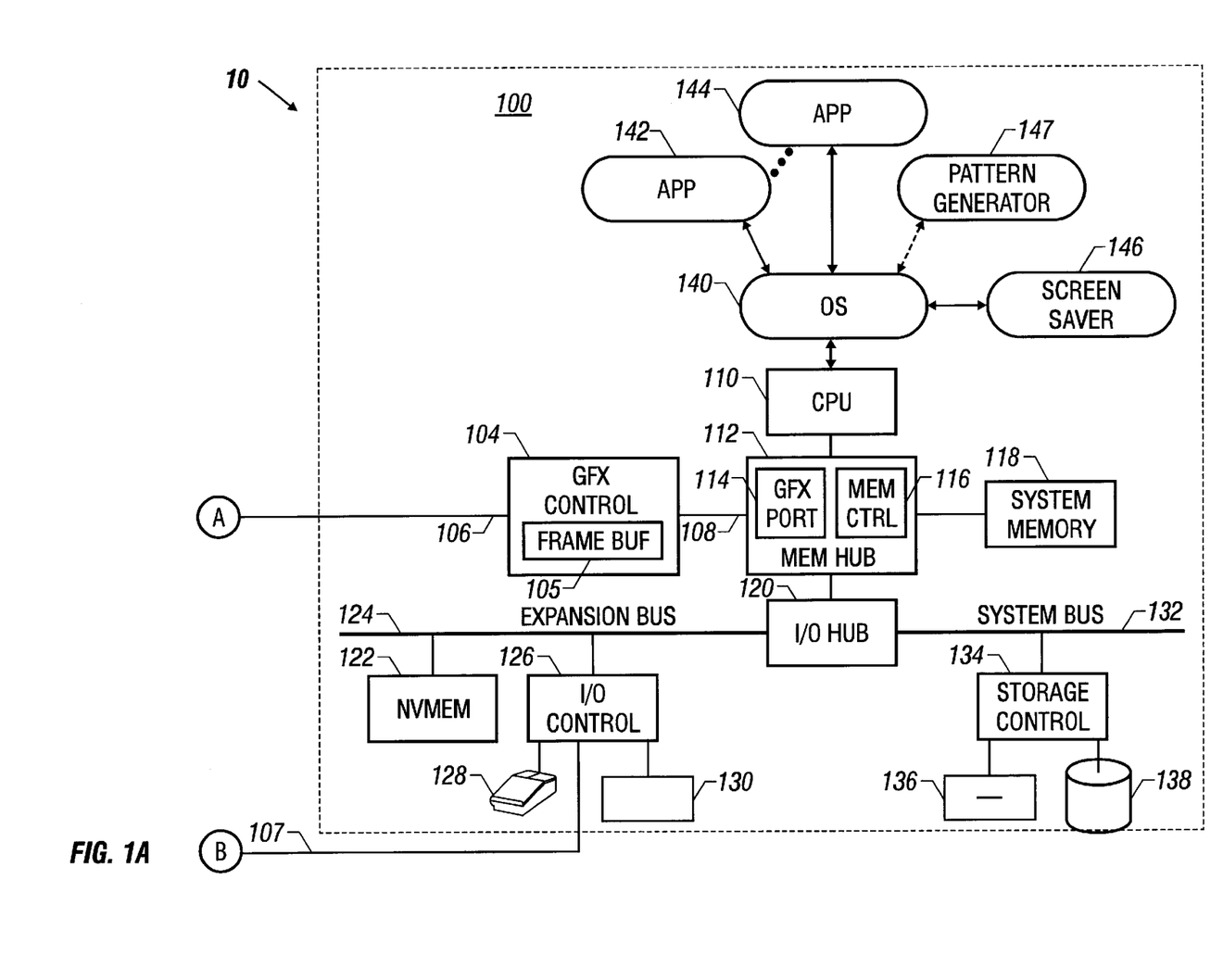
FIGS. 1A and 1B illustrate an embodiment of a liquid crystal display (LCD) projection system in combination with a computer system.
Figure 1B:
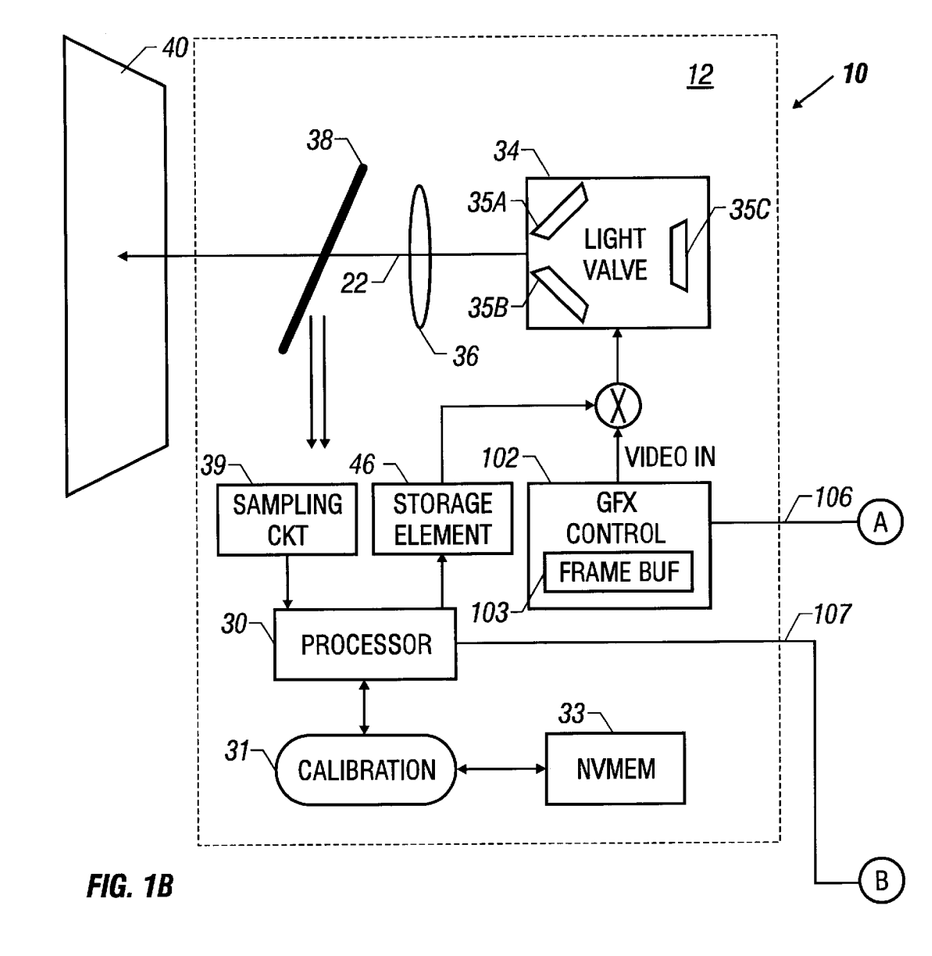

Referring to FIGS. 1A–1B, a projection display system 10 includes a projection display unit 12 that is operatively coupled to a control system 100 (e.g., a computer). In alternative embodiments, the projection display unit 12 and control system 100 may be integrated into one system that contains all or some of the components illustrated.

In the projection display unit 12, (FIG. 1B), a graphics controller 102 provides video data through a multiplier 32 to a light valve 34. The light valve 34 is adapted to provide a light output through a lens assembly 36 to an external display screen 40 positioned some distance away from the projection display unit 12. In one embodiment, the light valve 34 may include one or more liquid crystal display (LCD) panels 35 to provide the light output. For color output, multiple LCD panels 35A, 35B, 35C (corresponding to red, green, and blue, for example) may provide multiple light outputs that may be aligned to create a composite color image on the display screen 40. In further embodiments, one LCD panel may be used instead that can provide a color light output for display. Alternatively, the light valve 34 may include a monochrome LCD panel in another embodiment.

The displayed image outputted by the light valve 34 and lens assembly 36 is made up of an array of pixels. Due to manufacturing and component variations in the projection display unit 12 (including components in the light valve 34 and lens assembly 36), non-uniformities between pixels of the displayed image may occur. According to some embodiments, calibration for these non-uniformities may be performed during operation of the projection display unit 12. For example, predetermined patterns may be generated, either by processing elements in the projection display unit 12 or in the control system 100, for display by the light valve 34 and lens assembly 36 for calibration of image pixels. Such predetermined patterns may be generated by a screen saver or other pattern generating routines or devices specifically adapted to generate calibration patterns. A sample of the light output from the display unit 12 may be captured to perform calibration. For example, in some embodiments, calibration may be performed during idle periods of system operation in response to user request or whenever the screen saver is activated.

Video data for display is provided by a graphics controller 102 in the display unit 12, which may include an integrated frame buffer 103. The display controller 102 in the illustrated embodiment is coupled to the control system 100 over a bus 106, which may be a Video Electronics Standards Association (VESA) interface 202 to receive analog signals from a VESA cable 201. The VESA standard is further described in the Computer Display Timing Specification, v.1, rev. 0.8 that is available on the Internet at www.vesa.org/standards.html. These analog signals indicate images to be formed on the display 10 and may be generated by a graphics controller (104) card of a computer, for example. In an alternative embodiment, the bus 106 may be another type of bus, such as a digital bus, that may allow the graphics controller 104 in the control system 100 to provide video data directly to the light valve 34 so that the duplicative graphics controller 102 in the display unit 12 can be avoided.

To calibrate for non-uniformities in the display unit 12, a sampling glass 38 may be placed in the light output path 22 from the light valve 34 through the lens assembly 36 to the display screen 40. The sampling glass 38 captures a relatively small portion of the light output and directs it to sampling circuit 39 (described in more detail in connection with FIG. 4 below). The sampling circuit 39 digitizes the sampled light output portion and provides it to a processor 30 for processing.

In one embodiment, a calibration routine 31 is executable on the processor 30 to use one of various techniques, as described further below, to determine the amount of non-uniformity that may exist between and among image pixels. Based on the sampled light output portion, the calibration routine 31 creates an array of error coefficients that may be stored in a storage element 46 and applied to the multiplier 32 to adjust video data provided to the light valve 34. The error coefficient values are applied to calibrate the video data provided by the graphics controller 102 so that a more uniform output is provided from the light valve 34 and lens assembly 36. After the correction coefficients have been determined by the calibration procedure, they may be read out synchronously with the incoming video stream. The correction coefficients may then be applied by multiplying them with the video image, pixel by pixel.

The calibration routine 31 may be initially stored in a storage element in the projection display unit, such as in a non-volatile memory 33, e.g., an electrically erasable and programmable read-only memory (EEPROM), a flash memory, a battery-backed random access memory, a hard disk or floppy disk drive, and so forth. During execution, data and instructions associated with the calibration routine 31 may be stored in a storage element 46, which may be a memory such as a dynamic random access memory (DRAM), a static random access memory (SRAM) or a non-volatile memory.

According to some embodiments, predetermined calibration patterns are provided by CPU 110 in computer 10 through the graphics controller 104 as video data input to the display over bus 106. The light output from the light valve 34 is then captured and measured with the sampling circuit 39 in display 12. This measurement is sent to computer 10 over bus 106 using standards such as monitor plug and play or in other embodiments over a separate bus 107 such as a Universal Serial Bus (USB).

In some embodiments, the patterns used for calibration may be generated by a screen saver program 146 in the control system 100 or by some other suitable process (such as a pattern generating routine 147) in the system. Alternatively, the pattern may be generated by hardware circuitry in the control system 100, e.g., an application specific integrated circuit (ASIC), programmable gate array (PGA), or the like.

The control system 100 may include various layers, including an operating system (OS) 140 and one or more application processes 142 and 144. Software layers are executable on a central processing unit (CPU) 110, which in some embodiments may be a processor such as a microprocessor, microcontroller, ASIC, PGA, or other programmable control devices. The CPU 110 is coupled to a memory hub 112, which may include a graphics port 114 that is coupled to the graphics controller 104 over a graphics bus 108. In one embodiment, the graphics bus 108 may be defined by the Accelerated Graphic Port (AGP) Interface Specification, Revision 2.0, dated May 1998.

The memory hub 112 may also include a memory controller 116 that is coupled to a system memory 118. The memory hub 112 is also coupled to an input/output (I/O) hub 120 that provides ports to a primary or system bus 132 and a secondary or expansion bus 124. The system bus 132 may be coupled to a storage controller 134 that may be coupled to a hard disk drive 138, a compact disc (CD) or digital video disc (DVD) drive 136, and/or other storage elements. The expansion bus 124 may be coupled to an I/O controller 126 that is coupled to various input devices, such as a pointer device 128, a keyboard 130, and other devices. The expansion bus 124 may also be coupled to a non-volatile memory 122 to store startup routines such as basic input/output system (BIOS) routines used to start up the control system 100.

According to some embodiments, the screen saver 146 or pattern generating routine 147 may be custom-designed to provide desired patterns in the display image produced by the light valve 34. In another embodiment, the screen saver 146 may be any existing screen saver that is available off-the-shelf. An advantage of using a custom-designed screen saver 146 is that the calibration patterns outputted by the light valve 34 may be optimized. This allows the calibration routine to calibrate the display unit 12 based on the known calibration patterns. In the illustrated embodiment, the video data generated by the screen saver 146 or the pattern generator 147 is passed from the CPU 110 through the graphics port 114 and graphics controller 104 to the projection display unit 12 over the bus 106 and calibration data is passed back from controller 30 back to the routine running on CPU 110.

According to other embodiments, CPU 110 may place display 12 into a calibration mode where the pattern generation routine 31 runs in display 12 as a self contained process. Here the processor 30 creates patterns in frame buffer 103 and measures the resulting light output from sampling circuit 39.

Various different techniques may be used to generate patterns for performing calibration of the light valve 34. In the ensuing description, the routine that is adapted to generate a calibration pattern from the light valve 34 is referred to as the pattern generator, which may include the screen saver 146, the pattern generating routine 147, or any other routine that may be executable in the control system 100 or in the projection display unit 12. The pattern generator may also include hardware circuitry in the control system 100 or the display unit 12 in further embodiments.

Regardless of the routine being followed, the basic process is to present a pattern, measure the resulting light, and determine how the measured result differs from what was predicted by the pattern. For the purpose of discussion let us assume that the light valve 34 generates a display for projection on screen 40 of 1024×768 pixels. This yields a total of 786432 pixels. Also for the purpose of discussion let us assume that the light valve has a finite contrast ratio of the brightest possible value to the dimmest possible value of 300:1. If the calibration procedure were to set a single pixel to its maximum value in a field of otherwise dark pixels, the total light output would be:

300×1 pixel+1×786431 pixels=786731 "units"

where one pixel is at the highest output and the rest are at the limit of the contrast ratio of the display. Typically display systems require eight binary bits of accuracy for each color to present full color and a wide dynamic range of output. To eliminate the non-uniformity, the display needs to be calibrated to within one part in 512, or 9 bits of accuracy. To achieve this accuracy in the above stated scenario, the measurement must be made to one part in 1.5 million, or to 21 bits of accuracy using the example. This degree of accuracy is challenging to achieve inexpensively and very challenging to make at high speed. If the calibration routine illuminates many pixels or the calibration data comes from a standard program such as a screen saver the accuracy requirement is even higher.

What allows a simplification of this measurement is two facts. First the absolute luminosity of the display does not need to be calibrated. It does not matter if the display produces 50 lumens or 51 (for example), only that the field of illumination is calibrated to be uniform. Second if one removes all local effects from the calibration, or in other words, if the calibration is locally "level" everywhere, then it is globally "level". The situation is analogous to a farmer who wishes to level his field. He may take a board with a level and place it on the field. If the board tilts, he moves the dirt so that the board is level and then moves the board to some other place. If he continues to do this, eventually the field is level. A clever farmer might notice after several steps that there is an overall tilt from north to south after making repeated measurements and level his field faster by moving more dirt at once.

Likewise, a calibration procedure may measure the difference in output levels between two illumination cases and adjust the coefficients according to the local differences. Eventually global differences are eliminated. A more clever calibration algorithm will coalesce local measurements into increasingly larger regions to achieve a global calibration more quickly.

Figure 5:
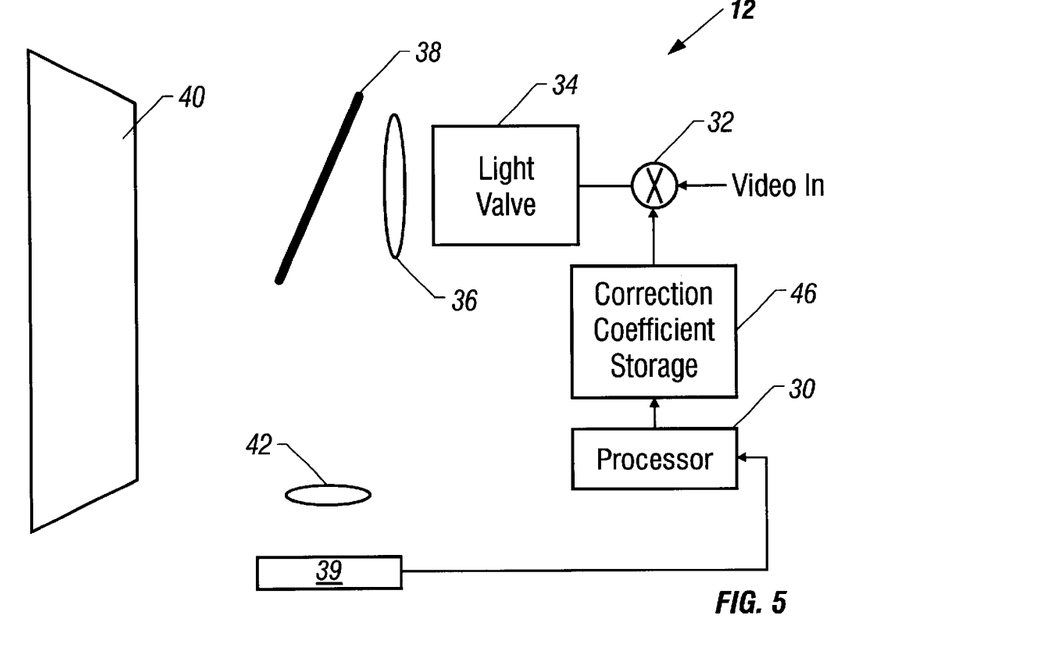
FIGS. 5 and 6 illustrate different embodiments of components in the projector system of FIGS. 1A–1B.
Figure 6:
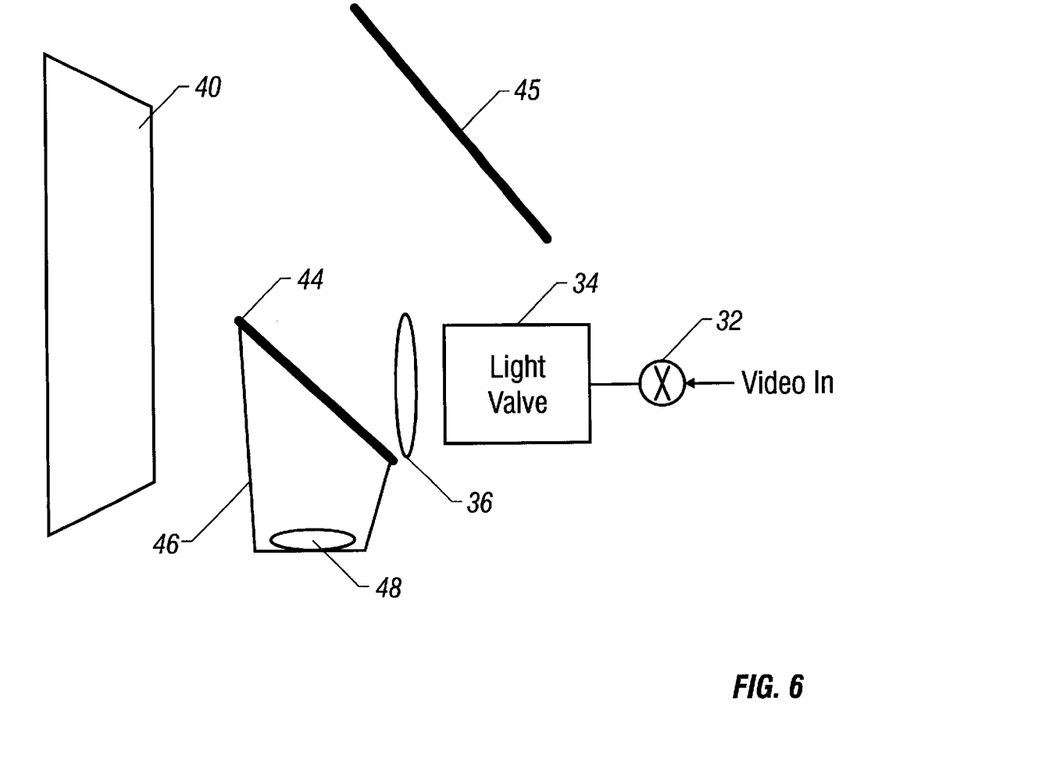

One technique for developing the light output from a display and extracting a sample of that light output, shown in FIG. 5, includes a multiplier 32 that receives a video input. In one embodiment of the invention, a variable gain amplifier or a pixel value multiplier may be used as the multiplier 32. The multiplier 32 may be coupled to a light valve 34, which in one embodiment of the present invention may include a reflective liquid crystal display (LCD). Light generated by the light valve 34 may pass through a projection lens 36, which projects the light onto a display screen 40 through a sampling glass 38.

The sampling glass 38, which may be made of any substantially transparent material (including glass or plastic), may effectively extract a small portion of the light output of the light valve 34 and projection lens 36 by virtue of its relatively low reflectivity. While most of the incident light passes through the glass 38, a small portion (for example, approximately 4%), may be reflected towards the sample lens 42. This small reflectivity may generally arise with any substantially transparent material. The glass 38 is oriented so that the reflected light falls on the sample lens 42.

The sample lens 42 collects the light from the glass 38 and passes the light for collection by the sampling circuit 39 that includes the photodetector 24. The photodetector 24 then provides the sampled light information to the processor 30 for calculation of the array of error coefficients.

Figure 4:
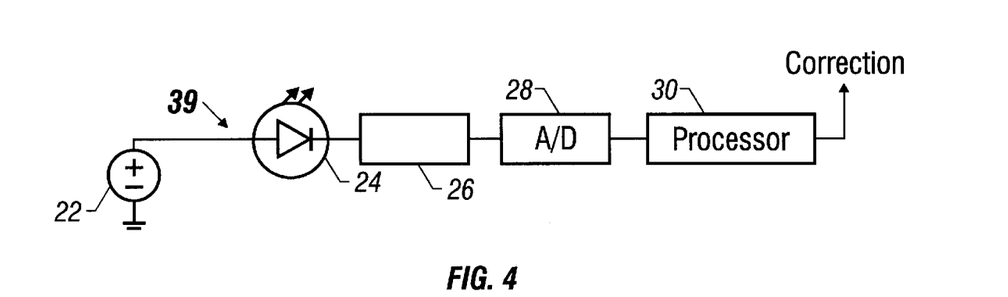
FIG. 4 illustrates a photodetector circuit in the LCD projection system of FIGS. 1A–1B.
Figure 7:
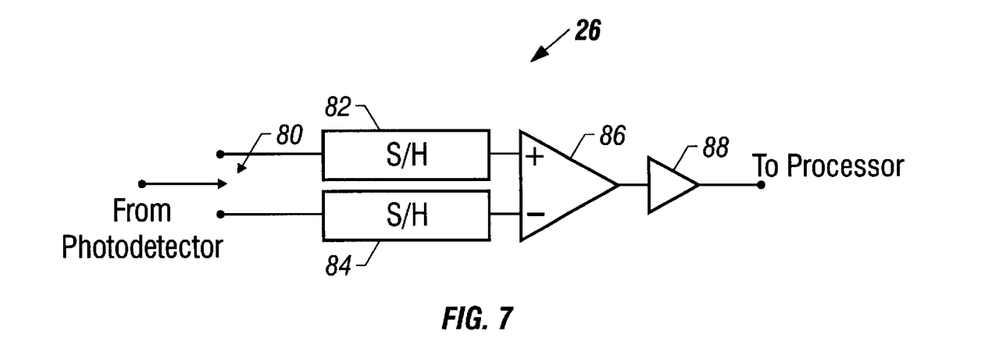
FIGS. 7 illustrates a circuit that forms part of the components of FIGS. 5 and 6.

Sampling circuit 39 is further diagrammed in FIGS. 4 and 7. In one embodiment, there is a source of D.C. bias, 22 which charges photodetector 24. Amplifier 26 detects the current from photodetector 24 and the result is converted into a digital value by analog-to-digital (A/D) converter 28 for the calibration program in processor 30. The amplifier 26 is shown in FIG. 7. Demultiplexing switch 80 feeds the measured result to sample and hold circuits 82 and 84 which hold the measured result from two different patterns as presented to light valve 34. Amplifier 86 forms the difference between these two values and gain amplifier 88 matches the dynamic range of the measurement to the dynamic range of A/D converter 28.

In one embodiment, demultiplexor 80 is driven from processor 30 under command of the calibration routine. The value generated by gain amplifier 88 for this first embodiment is the difference between specific frames as supplied by the calibration routine. In another embodiment demultiplexor 80 simply toggles back and forth between sample and hold circuits 82 and 84, at a rate determined by the frame rate of the video data coming over bus 106. The value generated by gain amplifier 88 for this second embodiment is the difference between any adjacent frames. If sampling circuit 39 is making difference measurements and the calibration routine provides calibration data which is expected to differ little from frame to frame, the gain amplifier 88 may use a larger gain value to expand the effective dynamic range of A/D 28 to increase its apparent accuracy. In this way A/D 28 may be much less than the required 21 bits as suggested by the previous example.

According to one embodiment, the pattern generator may move a single spot around the displayed image from frame to frame in either a direct pattern (e.g., scanning each pixel of each line like a raster) or in a pseudo-random pattern. The light output from the light valve 34 is thus provided by turning on one pixel at a time. The sampling circuit 39 is able to measure the differential light output of each pixel provided by the light valve 34 so that non-uniformity between pixels can be determined by the calibration routine 31. In this embodiment, the sampling circuit 39 is adapted to have sufficiently high accuracy in performing analog-to-digital conversion so that differences between pixels may be accurately detected. Differences in intensities are noted by the calibration routine 31 and used to adjust the error coefficients. In this embodiment, as each calibration pixel is turned fully on, each pixel should theoretically have the same intensity. However, because of non-uniformity in the display unit 12, some pixels may have lesser or greater intensities than others. The error coefficients are adjusted so that the intensity of a pixel to be calibrated is the same or about the same as its neighboring displayed image pixels. Other embodiments utilize other calibration patterns, as further described below.

According to another embodiment the pattern generator may move a group of pixels around the displayed image from frame to frame in a direct pattern or pseudorandom pattern. The total expected value can be easily computed from frame to frame and therefore the expected inter-frame difference can also be computed.

A group of background pixels may be illuminated to some gray value, e.g., 50% or other percentage of full scale. The group of illuminated background pixels can be random pixels sprinkled throughout the displayed image. According to this embodiment, the pixel to be calibrated is varied through a range of gray values, from dark to light. For example, the calibration pixel may first be set at 25% of full scale, then at 50% of full scale, and then at 75% of full scale. Additional illuminations may be performed at other gray values in further embodiments. The different measurements of the calibration pixel are used to determine the output curve of that pixel.

In this embodiment, calibration is based on the proportional impact that the calibration pixel has to the total sampled light output as compared to its expected impact as one pixel out of the entire group (e.g., group of 1,000 pixels). By choosing a relatively large number of illuminated background pixels (e.g., 1,000), the non-uniformities of those pixels are averaged. The slope of the output curve associated with the pixel to be calibrated is then compared by the calibration routine 31 to the slope of output curves of other pixels to determine the error coefficients to be applied to the video data input to the light valve 34. The calibration routine 31 according to this embodiment compares the ratios of light output from a given calibration pixel to the light output from an array of pixels. Because a comparison of ratios is being performed, the calibration process is not sensitive to lamp output variations in the light valve 34 as the lamp output factor appears in both the numerator and denominator of the ratios.

To improve the accuracy of the error coefficient array, calibration may be repeated. Because a screen saver or other pattern generating routine is used to perform calibration during operation of the system in some embodiments, the number of passes employed for accurate calibration is not a major concern.

In another embodiment, the pattern generator focuses on relatively small regions of pixels, e.g., 5×5 arrays of pixels. For a given array of pixels, the intensity of the array is varied through a defined pattern (which may be preselected or may be pseudo-random) and repeated measurements are made by the calibration routine 31. With a 5×5 array, for example, 25 measurements may be taken. Each measurement creates an equation including the 25 unknown coefficient values C1, C2, . . ., C25 for the array of 25 pixels. By taking 25 measurements, a 25×25 matrix of equations is created that is solved by the calibration routine 31 to determine the coefficient values C1, C2, . . . , C25 for the 5×5 array of pixels.

Subsequently, a second small region of pixels (e.g., 5×5 array) is selected to perform further calibration. Consecutive small regions of pixels may have some overlap to provide continuity between the calibrations of the different groups of pixels. In addition, repeated passes can be made to improve accuracy.

In another embodiment, an off-the-shelf screen saver 146 may be used, which may result in the calibration process not having control over the choice and pattern of illuminated pixels. The patterns generated by the screen saver 146 is chosen by the user and the manufacturer of the screen saver 146 and may change during operation of the system if the user so desires.

The screen saver 146 thus interacts with the calibration routine 31 to compare an expected output of the screen image with the measured output of the light valve 34. The calibration routine 31 maintains an array of correction values and uses the error terms computed from comparisons of the expected output to the measured output. The problem to be solved is that the calibration routine 31 does not have influence over the choice of illuminated pixels or how they are illuminated, and only receives a single data point for a result.

Figure 2:
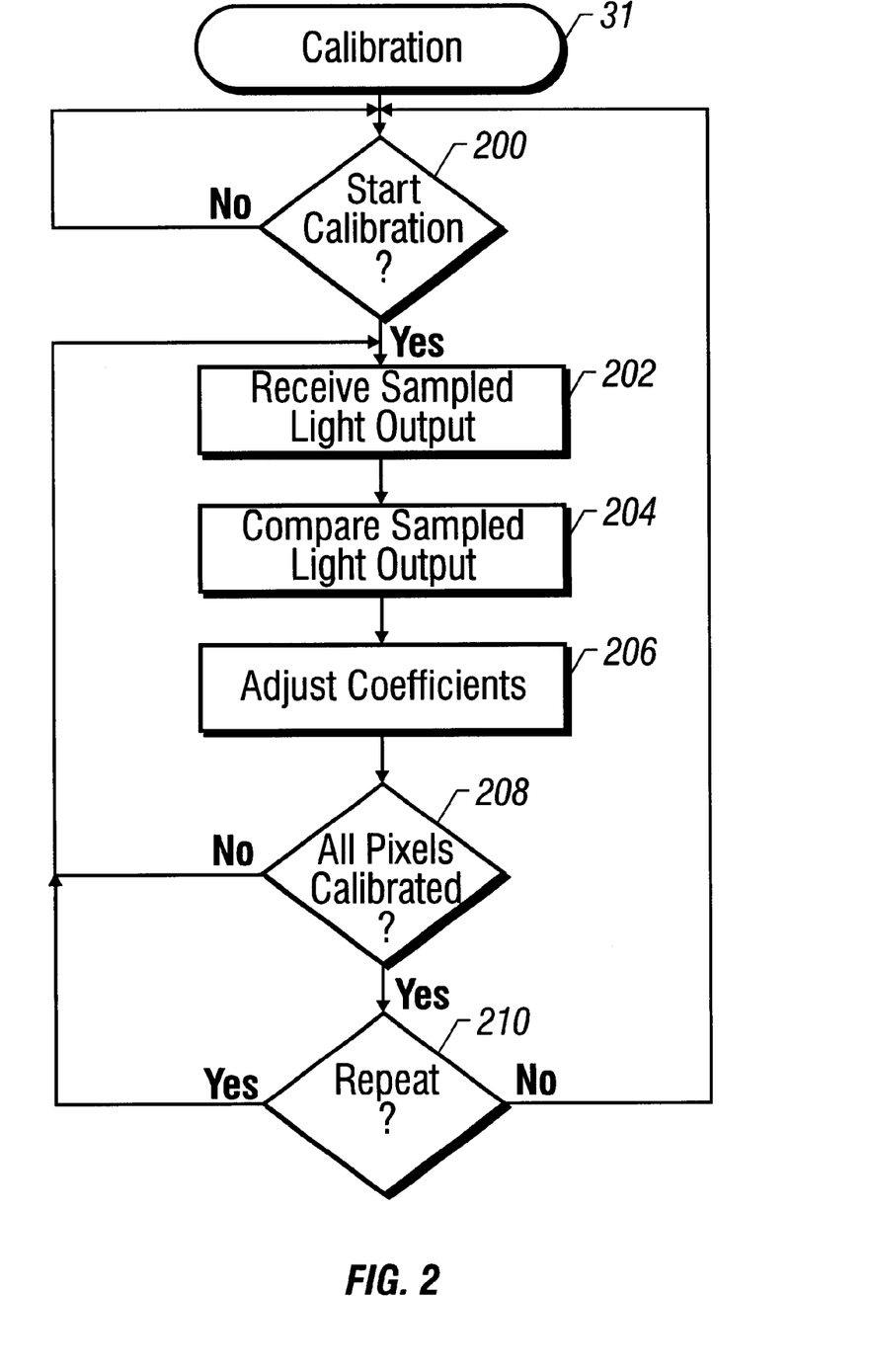
FIG. 2 is a flow diagram of example calibration routines according to embodiments executable in the LCD projection system of FIGS. 1A–1B.
Figure 3:
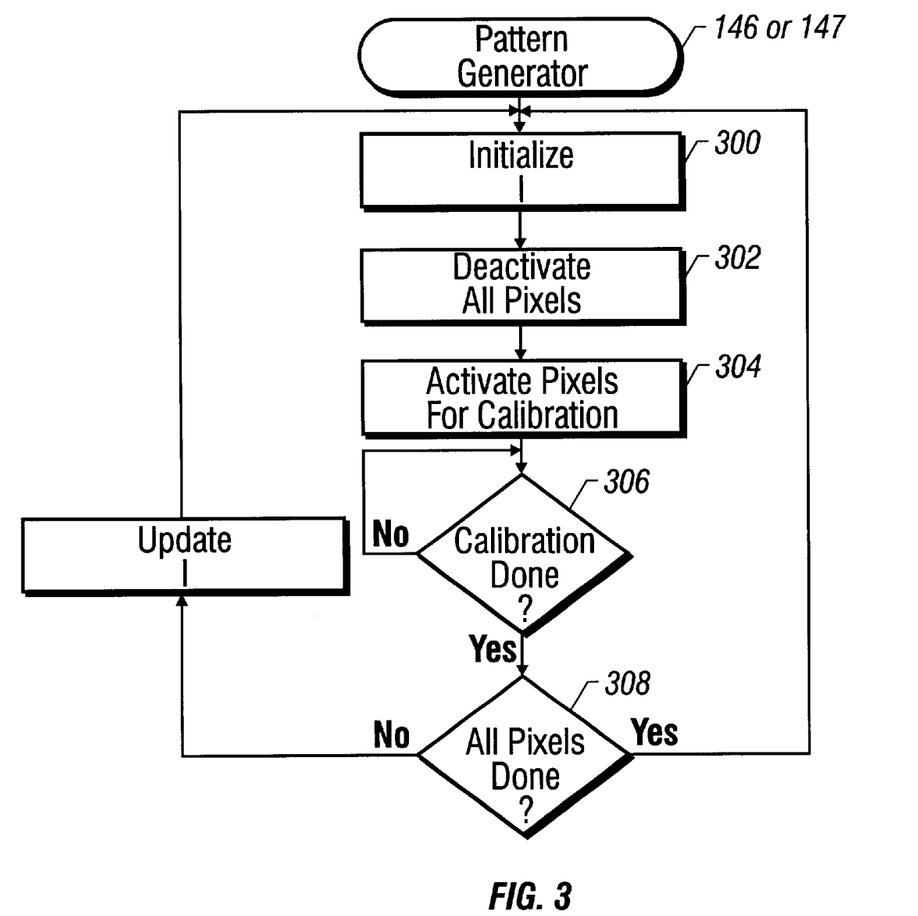
FIG. 3 is a flow diagram of a pattern generator routine according to one embodiment executable in the LCD projection system of FIGS. 1A–1B to generate predetermined image patterns for calibration.

Referring to FIG. 2, the calibration routine 31 according to this embodiment may determine (at 200) that calibration is to be started by receiving some indication from the control system 100 that a screen saver has been activated. The calibration routine 31 then calculates (at 202) the total expected output as follows:

$$\text{TotalExpected} = \sum_{i=0}^{N} \text{image}(i),$$

where image(i) is the video display data from the graphics controller 102 and N is the total number of pixels in the displayed image. The light output values sensed by the sampling circuit 39 is stored (at 204) in a parameter TotalActual. Thus, for each pixel j that is to be calibrated, the following coefficient Coefficient(j) is calculated (at 256):

$$\text{Coefficient}(j) = \text{Coefficient}(j) * \left[1 + \left(\frac{\text{TotalExpected}}{\text{TotalActual}} - 1\right) * \frac{\text{image}(j) * N}{\text{TotalExpected}}\right].$$

This process distributes the error measured by sample circuit 39 across all active pixels, j=0. N where N is the total of the non-zero pixels. While this does not adjust individual pixels exactly, each iteration reduces the total mean squared error and with sufficient calibration passes will produce any desired degree of accuracy.

Advantages offered by some embodiments of the invention include the ability to calibrate the display system during idle use of the system, such as when a screen saver is on. This avoids the necessity of performing factory calibration, which may be time consuming to calibrate each pixel for three colors for a high resolution display which may include about a million pixels or more. In addition, specialized test hardware may be needed to calibrate arrays of pixels in parallel.

With an accurate sample of the effective light output of the display, the display's non-uniformity may be calibrated. This may be done using an exhaustive calibration process where the display computes the correction coefficients for each pixel. This calibration may be done, for example, during a display installation process. Where the display includes a large number of pixels, this may be time consuming but would produce relatively accurate results to those consumers willing to expend the needed calibration time.

Alternatively, one can calibrate lens anomalies first by projecting a pattern of increasing diameter rings. The increasing diameter rings may be indicative of typical lens anomalies. Other patterns can be used as well to stimulate systematic optical or other defects. This technique takes less time but only corrects for a single source of error.

In still another alternative, the display may perform automatic periodic calibration passes, randomly choosing a large number of pixels and determining the total output from this group of pixels. The differences from all activated pixels are recorded. With a sufficient number of calibration passes, the display eventually converges to calibration. The resulting output of the entire display to each calibration image may be recorded and expected light output computed. As the display data changes, the expected contribution of each pixel changes. With a sufficient number of expected to actual comparison steps, the display eventually converges to calibration.

Instead of user initiated calibration the calibration of the display may be performed at the display factory. In this example, the display may perform the calibration procedure during the normal manufacturing bum-in process. This achieves two results at once, burn-in and calibration, reducing the effective burden of the calibration procedure to the manufacturer and the need for user calibration.

After the correction coefficients have been determined by the calibration procedure, they may be read out synchronously with the incoming video stream. The correction coefficients may then be applied by multiplying them with the video image, pixel by pixel.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A method of calibrating a display comprising:
    developing a first signal indicative of the light output of a first set of pixels of a display;
    developing a second signal indicative of the light output of a second set of pixels of the display;
    developing a third signal indicative of the difference between said first and second signals; and
    converting the third signal into a digital signal.

2. The method of claim 1 including generating a light output containing image information, extracting a sample from said light output, using said sample to calibrate the display and projecting the light output onto a screen.

3. The method of claim 2, wherein generating a light output includes using a light valve.

4. The method of claim 3 including using a reflective projection display to generate said light output.

5. The method of claim 1, wherein developing said first and second signals includes using a sample and hold circuit to develop said first and second signals.

6. The method of claim 5 including sending said first signal to a first sample and hold circuit and sending said second signal displaced in time from said first signal to a second sample and hold circuit.

7. The method of claim 2 wherein extracting a light sample includes causing the light output to shine on a substantially reflective surface and obtaining a sample from light output transmitted through said reflective surface.

8. The method of claim 2 wherein extracting a light sample includes causing the light output to shine on a substantially transmissive surface and extracting a sample from light reflected from said transmissive surface.

9. The method of claim 2, including analyzing said sample to get a measure of the intensity of the light output.

10. The method of claim 1, wherein said first signal is developed from one pixel.

11. A display comprising:
    a first photosensitive device adapted to develop a signal indicative of the light output of the display;
    a circuit adapted to subtract a signal indicative of the dark field light output of the display from the output of the display when less than all the pixels are activated; and
    an analog to digital converter coupled to said photosensitive device and said circuit.

12. The display of claim 11 wherein said circuit includes a pair of sample and hold devices coupled to receive serial inputs and to provide parallel outputs.

13. The display of claim 12 wherein said sample and hold devices are coupled to a differential amplifier.

14. The display of claim 13 including a processor coupled to said analog to digital converter.

15. A circuit for providing a correction signal to a display comprising:
    a photosensitive device;
    a first circuit adapted to sample and hold a first signal indicative of the light output of less than all the pixels of the display;
    a second circuit adapted to sample and hold a second signal indicative of the light output of the display;
    a device that is adapted to direct a signal indicative of the light output of a first plurality of pixels of the display to said first circuit and a signal indicative of the light output of a second plurality of pixels of the display to said second circuit; and
    a differential amplifier arranged to subtract the output from said first and second circuits.

16. The circuit of claim 14 including an analog to digital converter coupled to said differential amplifier.

* * * * *